(12) United States Patent
Lee

(10) Patent No.: US 12,415,439 B2
(45) Date of Patent: Sep. 16, 2025

(54) ELECTRIC VEHICLE THAT MANAGES A BATTERY CONDITION AND A BATTERY CONDITIONING MANAGEMENT METHOD

(71) Applicants: HYUNDAI MOTOR COMPANY, Seoul (KR); KIA CORPORATION, Seoul (KR)

(72) Inventor: Hye Joo Lee, Bucheon-si (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 571 days.

(21) Appl. No.: 17/943,378

(22) Filed: Sep. 13, 2022

(65) Prior Publication Data

US 2023/0079044 A1    Mar. 16, 2023

(30) Foreign Application Priority Data

Sep. 16, 2021    (KR) .................. 10-2021-0124064

(51) Int. Cl.
| | |
|---|---|
| *B60L 53/00* | (2019.01) |
| *B60L 58/10* | (2019.01) |
| *B60L 58/12* | (2019.01) |
| *B60L 58/24* | (2019.01) |
| *H01M 10/42* | (2006.01) |
| *H01M 10/44* | (2006.01) |

(52) U.S. Cl.
CPC .............. *B60L 58/24* (2019.02); *B60L 53/00* (2019.02); *B60L 58/10* (2019.02); *B60L 58/12* (2019.02); *H01M 10/425* (2013.01); *H01M 10/443* (2013.01); *H01M 2010/4271* (2013.01); *H01M 2010/4278* (2013.01); *H01M 2220/20* (2013.01)

(58) Field of Classification Search
USPC ........ 320/132, 133, 134, 135, 136, 137, 138
See application file for complete search history.

(56) References Cited

U.S. PATENT DOCUMENTS

| | | | |
|---|---|---|---|
| 11,567,503 B1 * | 1/2023 | Roy ....................... | G05D 1/028 |
| 2021/0138957 A1 * | 5/2021 | Peng ................... | B60L 15/2045 |

FOREIGN PATENT DOCUMENTS

KR    20150034857 A    4/2015

* cited by examiner

*Primary Examiner* — Brian Ngo
(74) *Attorney, Agent, or Firm* — Lempia Summerfield Katz LLC

(57) ABSTRACT

To shorten a charging time of a battery and improve driving performance, proposed is an electric vehicle for performing battery condition management by dividing a management mode of the battery into a recommended mode according to a preset program, a custom mode according to a program in which a user modifies a condition applied by the preset program, and a free mode according to compulsory intention of the user, and a battery conditioning management method. The electric vehicle controls the temperature of the battery installed in the electric vehicle according to a preset battery management mode using a head unit, a CCS server, a VCU, and a BMS.

18 Claims, 7 Drawing Sheets

FIG. 2

| BATTERY CONDITIONING | WHEN PARKED | IN MOTION |
|---|---|---|
| SETTING INTERFACE | - HU-EV SETTING → BATTERY CONDITIONING | |
| TRIGGER CONDITION | - RESERVED CHARGING/AIR CONDITIONING<br>- IMMEDIATE CHARGING/AIR CONDITIONING | - CHARGING STATION IS SET AT DESTINATION OR WAYPOINT |
| TARGET BATTERY TEMPERATURE | - AROUND 10°C | - AROUND 20°C |
| BATTERY CONDITIONING REFERENCE CONDITIONS | - RESERVED CHARGING DEPARTURE TIME | - REMAINING DISTANCE/REMAINING TIME TO CHARGING STATION<br>- CHARGING TYPE INFORMATION (AD/DC) OF CHARGING STATION |
| DISPLAY SUBJECT DURING OPERATION | - PHONE APPLICATION | - CLUSTER |
| VEHICLE POWER CONDITION | - IGN3 (SLOW CHARGER CONNECTION CONDITION) | - EV READY (START CONDITION) |
| OTHERS | - WHEN BATTERY SOC LEVEL DROPS TO 20% OR LESS, BATTERY CONDITIONING OPERATION (HEATING/COOLING) IS IMMEDIATELY SUSPENDED | |

ELECTRIC VEHICLE THAT MANAGES A BATTERY CONDITION AND A BATTERY CONDITIONING MANAGEMENT METHOD

CROSS-REFERENCE TO RELATED APPLICATION

This application claims priority to and the benefit of Korean Patent Application No. 10-2021-0124064, filed on Sep. 16, 2021, the entire contents of which are hereby incorporated by reference.

FIELD

The present disclosure relates to a system and method for managing a battery, and more particularly, to an electric vehicle that manages a battery condition, and a battery conditioning management method.

BACKGROUND

The statements in this section merely provide background information related to the present disclosure and may not constitute prior art.

In general, unlike a general internal combustion engine vehicle, an electric power vehicle (hereinafter referred to as an electric vehicle) drives the vehicle using an electric motor (drive motor), and uses a high-voltage battery for supplying electric power to the drive motor. For example, the high-voltage battery is a lithium-ion battery, and performance and efficiency of the battery may deteriorate depending on the temperature of the outside air due to chemical characteristics of a material that is a component of the battery. For example, when the battery is cooled, the output of the battery is limited, and thus it is desired to maintain the battery at an appropriate temperature in order to improve output performance.

In addition to the effect of the battery temperature on the battery output, the battery temperature is correlated with a charging time of the battery. For example, when the battery temperature is −5° C. or less, the charging time is about 50 minutes, and when the battery temperature is the room temperature, which is 20° C., the charging time is about 18 minutes. In this way, the charging time greatly varies depending on the battery temperature. Therefore, since charging takes a long time when the battery temperature decreases, it is necessary to manage the battery temperature above a certain temperature.

SUMMARY

The present disclosure provides an electric vehicle that manages a battery condition and a battery conditioning management method that substantially obviate one or more problems due to limitations and disadvantages of the related art.

In one embodiment of the present disclosure, an electric vehicle manages a battery condition to perform battery conditioning by dividing a management mode of a battery into a recommended mode according to a preset program, a custom mode according to a program in which a user modifies a condition applied by the preset program, and a free mode according to compulsory intention of the user to shorten a charging time of the battery and improve driving performance.

Another embodiment of the present disclosure is a battery conditioning management method for performing battery conditioning by dividing a management mode of a battery into a recommended mode according to a preset program, a custom mode according to a program in which a user modifies a condition applied by the preset program, and a free mode according to compulsory intention of the user to shorten a charging time of the battery and improve driving performance.

Additional advantages, objects, and features of the present disclosure are set forth in part in the description which follows and in part should become apparent to those having ordinary skill in the art upon examination of the following or may be learned from practice of the present disclosure. The objectives and other advantages of the present disclosure may be realized and attained by the structure particularly pointed out in the written description and claims hereof as well as the appended drawings.

To achieve these objects and other advantages and in accordance with the purpose of the present disclosure, as embodied and broadly described herein, an electric vehicle for managing a battery condition includes a head unit, a vehicle control unit (VCU), and a battery management system (BMS). The head unit sets and changes a battery management mode, and displays information related to a battery conditioning operation performed on a battery according to the battery management mode. The VCU controls a battery conditioning process according to the battery management mode. The BMS generates state information of the battery, delivers the state information to the head unit, detects a temperature of the battery, heats and cools the battery, and manages start and suspension values of the battery conditioning operation. The battery management mode includes an automatic mode in which the VCU and the BMS perform battery conditioning according to a preset setting condition, and a manual mode in which a user forcibly performs battery conditioning, the state information of the battery includes a state of charge (SOC) of the battery and battery conditioning operation information, and the battery conditioning operation information includes at least one of a temperature of the battery, estimated power consumption up to an SOC level for achieving a target temperature of the battery, or an estimated time up to the SOC level.

In another aspect of the present disclosure, a battery conditioning management method for controlling a temperature of a battery according to a preset battery management mode includes performing a recommended mode in which a battery conditioning process is performed according to a program preset by a VCU and a BMS using presence or absence of remote control expected to be used by an electric vehicle and whether a charging station is set in a driving destination or a waypoint of the electric vehicle as a trigger condition, and performing a custom mode in which a battery conditioning process is performed by the VCU and the BMS under a condition arbitrarily changed by a user of the electric vehicle among conditions reflected in the program for performing the battery conditioning process in the recommended mode.

It is to be understood that both the foregoing general description and the following detailed description of the present disclosure are exemplary and explanatory and are intended to provide further explanation of the present disclosure.

BRIEF DESCRIPTION OF THE DRAWINGS

The accompanying drawings, which are included to provide a further understanding of the present disclosure and are incorporated in and constitute a part of this application, illustrate embodiment(s) of the present disclosure and together with the description serve to explain the principle of the present disclosure. In the drawings:

FIG. 2 is an embodiment of conditions for performing battery conditioning in a recommended mode;

DETAILED DESCRIPTION

Reference is now be made in detail to the embodiments of the present disclosure, examples of which are illustrated in the accompanying drawings. Wherever possible, the same reference numbers are used throughout the drawings to refer to the same or like parts.

When a component, device, element, or the like of the present disclosure is described as having a purpose or performing an operation, function, or the like, the component, device, or element should be considered herein as being "configured to" meet that purpose or to perform that operation or function.

Hereinafter, as a process for managing a temperature of a battery of an electric vehicle in the present disclosure, battery conditioning, battery conditioning process, and battery conditioning operation are used interchangeably.

Figure 1:
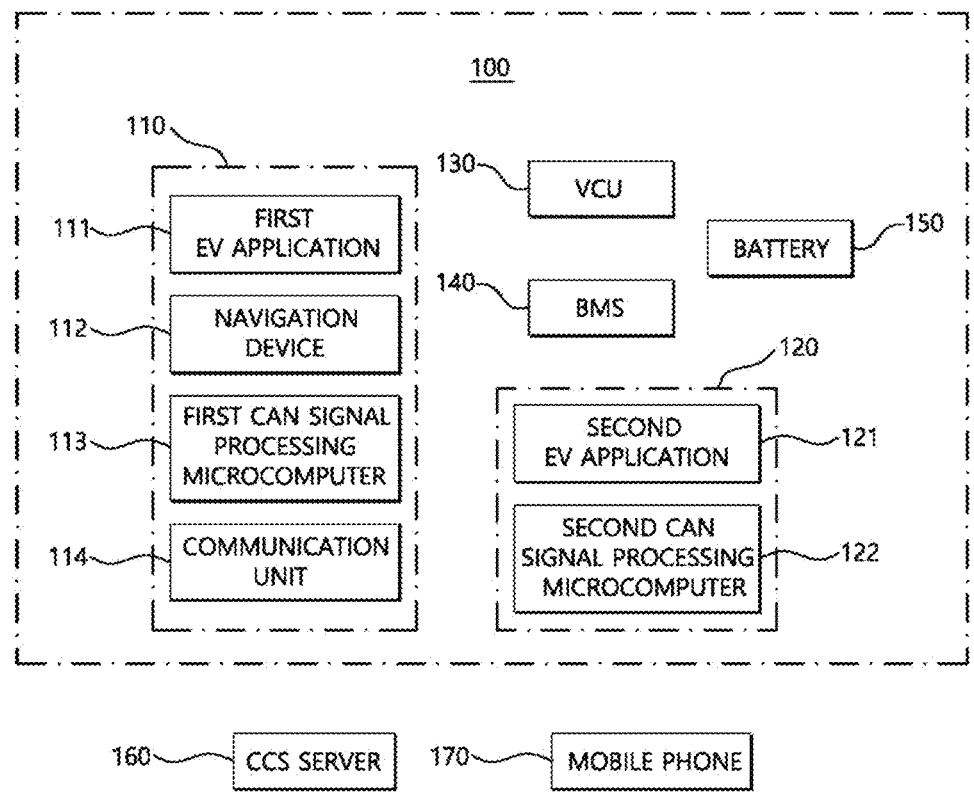
FIG. 1 is an embodiment of an electric vehicle that manages a battery condition according to the present disclosure.

FIG. 1 is an embodiment of an electric vehicle that manages a battery condition according to the present disclosure.

Referring to FIG. 1, an electric vehicle 100 (hereinafter referred to as an electric vehicle) that manages a battery condition may be implemented by including some or all of a head unit 110, a cluster 120, a VCU 130, a BMS 140, and a battery 150.

The head unit 110 provides a means for a user or a manufacturer of the electric vehicle to set or change a battery management mode, and may display information related to a battery conditioning operation performed on the battery according to the set battery management mode. The head unit 110 includes a first EV application 111, a navigation device 112, a first CAN signal processing microcomputer 113, and a communication unit 114.

The first EV application 111 provides a user setting interface by verifying whether or not the provision of a battery conditioning service of the electric vehicle in which the head unit 110 is installed (a dash-dotted rectangle of FIG. 1) is set.

The navigation device 112 checks battery conditioning setting information set in the first EV application 111, and when battery conditioning setting is activated, the navigation device 112 provides at least one of whether a charging station is set as a destination or a waypoint, a remaining time and a driving distance to the charging station, or charging type information of the charging station. Here, the charging type means that charging current is either AC or DC. The first CAN signal processing microcomputer 113 delivers a control signal including state information of the battery received from the VCU 130 and the BMS 140 to the first EV application 111, and transmits information generated by the navigation device 112 to the outside through a controller area network (CAN). The communication unit 114 transmits the battery state information received from the first CAN signal processing microcomputer 113 to a connected car services (CCS) server 160.

The cluster 120 activates an icon which indicates an operation of battery conditioning when the electric vehicle is in motion, or displays information related to battery conditioning. The cluster 120 includes a second EV application 121 and a second CAN signal processing microcomputer 122. Functions of the second EV application 121 and the second CAN signal processing microcomputer 122 are similar to functions of the first EV application 111 and the first CAN signal processing microcomputer 113, and thus a description thereof will be omitted.

The VCU 130 controls the battery conditioning operation for the battery 150 together with the BMS 140 to be described later according to the set battery management mode.

The BMS 140 generates battery state information, delivers the generated battery state information to the head unit 110, detects the temperature of the battery 150. The BMS 140 heats and cools the battery 150, and manages start and suspension values of the battery conditioning operation.

In one embodiment, the CCS server 160 and a mobile phone 170 are used as functional blocks that communicate with the functional blocks installed inside the electric vehicle 100 and assist in performing the battery management mode of the electric vehicle 100.

The CCS server 160 receives and stores the state information of the battery 150 from the head unit 110. The CCS server 160 further delivers, in real time, the battery state information to a phone application server (not illustrated), which provides a service to a phone application of the mobile phone 170. Here, the battery state information includes an SOC of the battery and battery conditioning operation information. The battery conditioning operation information includes the temperature of the battery, and estimated power consumption and an estimated time up to an SOC level for achieving a target temperature of the battery.

The mobile phone 170 receives the battery state information from the CCS server 160 and displays the battery state information, or uses activation information of the battery conditioning operation received from at least one of the VCU 130, the BMS 140, or the head unit 110 and displays an indication that the battery conditioning operation is activated, or allows the user to reserve the charge of the battery, change setting of the battery management mode, and remotely control the charge. Even though the mobile phone 170 is illustrated as being located outside the electric vehicle (inside of the dash-dotted rectangle) in FIG. 1, it is possible to adopt an embodiment in which the mobile phone 170 is located inside the electric vehicle.

The battery management mode proposed by the present disclosure may be divided into an automatic mode and a manual mode. The automatic mode refers to a mode in which the VCU 130 and the BMS 140 automatically perform operation according to a preset program without change or according to a change by the user, and the manual mode (or free mode) refers to a mode in which the user, that is, a driver of the electric vehicle, checks information related to the battery temperature, and then arbitrarily and directly directs the battery conditioning process.

The automatic mode may be divided into a recommended mode and a custom mode.

In the recommended mode, battery conditioning is performed according to a program set at the time of manufacture by a manufacturer of the electric vehicle or preset by the user. In the custom mode, the user is allowed to change at least one of a plurality of execution conditions included in a program and perform battery conditioning.

The above-described program causes the battery conditioning process to be performed by reflecting at least one condition among a setting interface, a trigger condition, a target battery temperature, a battery conditioning operation condition, a display subject during operation, a vehicle power condition, or a battery conditioning operation suspension condition for each of when the electric vehicle is parked and when the electric vehicle is in motion. An execution condition changeable by the user in the custom mode is one of the conditions reflected in the program.

FIG. 2 is an embodiment of conditions for performing battery conditioning in the recommended mode.

Referring to FIG. 2, the trigger condition is whether reserved charging/air conditioning and immediate charging/air conditioning are set when the electric vehicle is parked, and whether a charging station is set as a destination or a waypoint when the electric vehicle is in motion. The target battery temperature is around 10° C. when the electric vehicle is parked and is around 20° C. when the electric vehicle is in motion. The battery conditioning reference condition is a departure time of the electric vehicle when the electric vehicle is parked, and is a remaining distance/remaining time to the charging station and the presence of charging type information of the charging station when the electric vehicle is in motion. The display subject during operation is the mobile phone 170 on the assumption that that the user is outside the electric vehicle when the electric vehicle is parked, and is the cluster 120 when the electric vehicle is in motion. The battery conditioning operation suspension condition is, for example, 20% or less, which is a preset specific level set by a battery SOC level.

In addition, the vehicle power condition is IGN3, which is a slow charger connection condition, when the electric vehicle is parked, and EV Ready, which is a start condition, when the electric vehicle is in motion.

Here, IGN3 refers to a state in which the slow charger and the vehicle are connected to each other, and a charge-related controller, an air conditioning-related controller, and the head unit 110 are maintained in a wake-up state so that reserved charging or air conditioning is possible in the vehicle. In addition, EV Ready is the same state as an ignition-ON state, and a state in which the electric vehicle is in motion refers to the ignition-ON state.

Reserved charging is based on the assumption that the vehicle is connected to the slow charger, a reserved charging or charging start time, the charging amount, a charging end time, and an air-conditioning-related value such as an air conditioning start time are entered, and the user leaves the vehicle. For example, the slow charger is connected at 10 p.m., the user leaves the vehicle, charging starts at 12 p.m., and 100% charging is finished at 7 a.m.

Hereinafter, a battery conditioning management method according to the present disclosure is described.

As described above, the battery management mode proposed by the present disclosure includes the automatic mode and the manual mode, and the automatic mode includes the recommended mode and the custom mode. Hereinafter, the recommended mode and the custom mode are sequentially described.

In the following description, it is assumed that the recommended mode and the custom mode are performed by an electric vehicle 100 according to the present disclosure as illustrated in FIG. 1.

Figure 3:
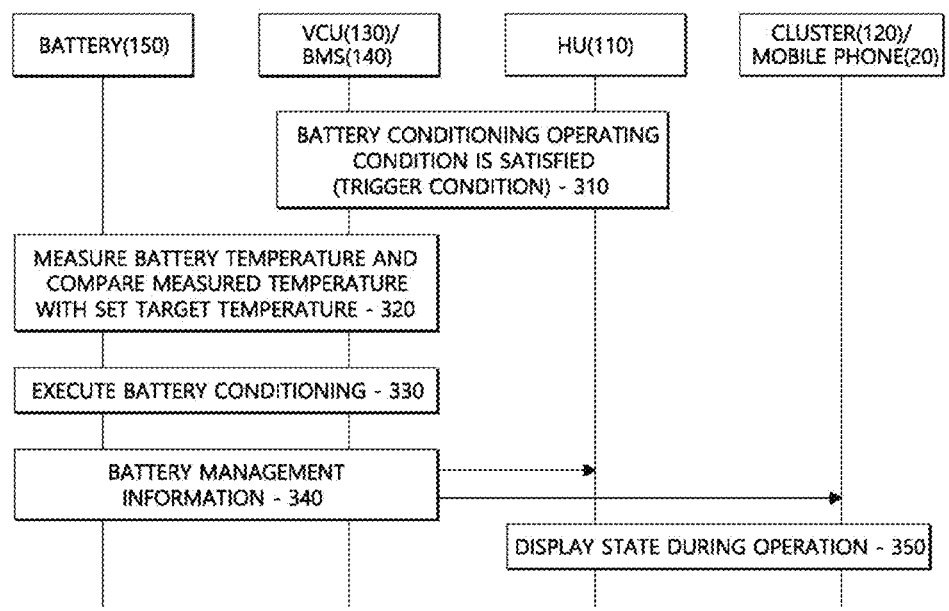
FIG. 3 illustrates an operation mechanism of the recommended mode included in a battery conditioning management method.

FIG. 3 illustrates an operation mechanism of the recommended mode included in the battery conditioning management method.

Referring to FIG. 3, a recommended mode 300 is performed by the battery 150, the VCU 130, the BMS 140, the head unit 110, and the cluster 120/mobile phone 170.

The VCU 130 and the BMS 140 determine whether a battery conditioning operating condition is satisfied together with the head unit 110 (310). The battery conditioning operating condition may be referred to as a trigger condition in a narrow sense.

Upon determining that the battery conditioning operating condition is satisfied, the VCU 130 and the BMS 140 detect the temperature of the battery 150, compare the current temperature of the battery 150 with the target battery temperature included in the battery conditioning operating condition (320), and then execute the battery conditioning operation according to a comparison result (330).

When the battery conditioning operation is executed, the VCU 130 and the BMS 140 deliver an execution process and management information to at least one of the head unit 110, the cluster 120, or the mobile phone 170 (340) and display the execution process and management information (350). Thus, the user may select one of the head unit 110, the cluster 120, or the mobile phone 170 and visually check the battery conditioning process.

The information displayed on the head unit 110, the cluster 120, and the mobile phone 170 may include, for example, at least one of the current temperature of the battery 150, the target temperature of the battery 150, power consumption required to control the battery temperature, an expected distance to empty (DTE) after completion of battery conditioning, or an expected charging time of the battery.

The recommended mode includes a first recommended sub-mode performed when the electric vehicle is parked and a second recommended sub-mode performed when the electric vehicle is in motion. In order to perform the battery conditioning process according to the recommended mode, the following prerequisites need to be satisfied.

In the first recommended sub-mode, the electric vehicle needs to be parked, the user of the electric vehicle completes account linking and system with the mobile phone of the user, and a state in which the user activates a function of performing the battery conditioning management method according to the present disclosure is the default. In a state where the above basic conditions are satisfied, the user needs to enter a departure time, enter reserved charging in advance, or execute reserved charging (air conditioning) and immediate charging (air conditioning) through an application of the mobile phone 170. In addition, the power condition of the electric vehicle may be an IGN3 state, which is the slow charger connection condition.

In the second recommended sub-mode, the electric vehicle needs to be in motion and the user needs to set a charging station as a destination or waypoint of the vehicle on a navigation system. In order to satisfy the condition that the electric vehicle is in motion, the power condition of the electric vehicle needs to be in an EV ready state, which is the start condition.

Figure 4:
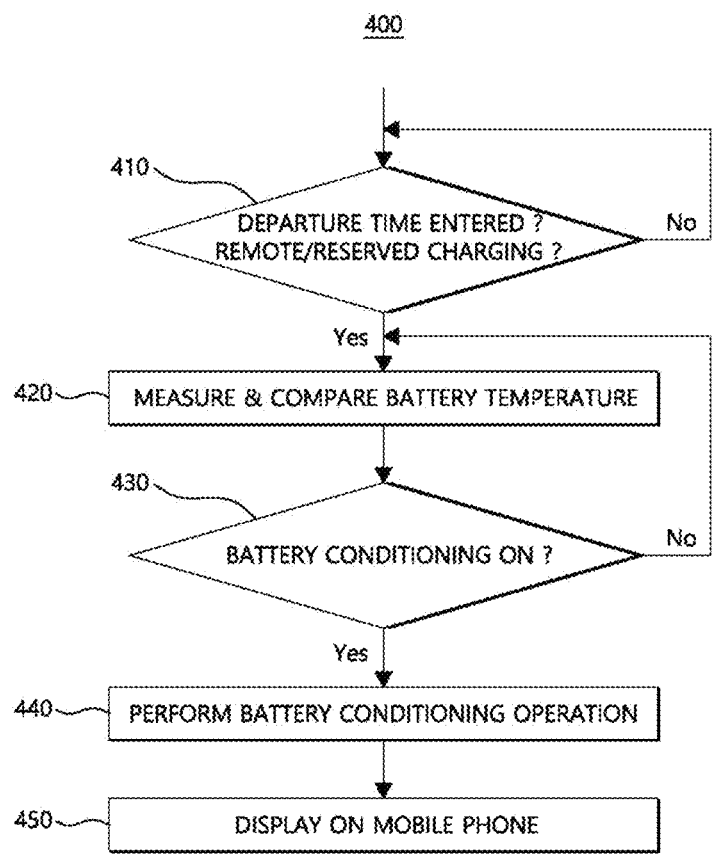
FIG. 4 is an embodiment of a first recommended sub-mode in the recommended mode.

FIG. 4 is an embodiment of the first recommended sub-mode in the recommended mode.

Referring to FIG. 4, a first recommended sub-mode 400 includes a step 410 of determining whether a first trigger condition is satisfied. The first trigger condition includes at least one of a departure time and reserved charging entered by the user of the electric vehicle, reserved charging (air conditioning) through an application of the mobile phone, or execution of immediate charging (air conditioning). The first recommended sub-mode 400 further includes a step 420 of comparing the battery temperature with a preset optimum temperature to determine whether the battery temperature is low or high compared to the preset optimum temperature upon determining that the first trigger condition is satisfied (Yes). The first recommended sub-mode 400 further includes a step 430 of determining whether to perform the battery conditioning operation according to the temperature of the battery, and a step 440 of performing the battery conditioning operation upon determining to perform the battery conditioning operation in the step 430 of determining whether to perform the battery conditioning operation (Yes). The first recommended sub-mode 400 further includes a step 450 of displaying start of the step 440 of performing the battery conditioning operation on an application of the mobile phone 170 when the step 440 is started.

In particular, in the step 430 of determining whether to perform the battery conditioning operation, a process of calculating a time and power required when the temperature of the battery 150 is conditioned to the optimum temperature until the departure time is further performed.

Figure 5:
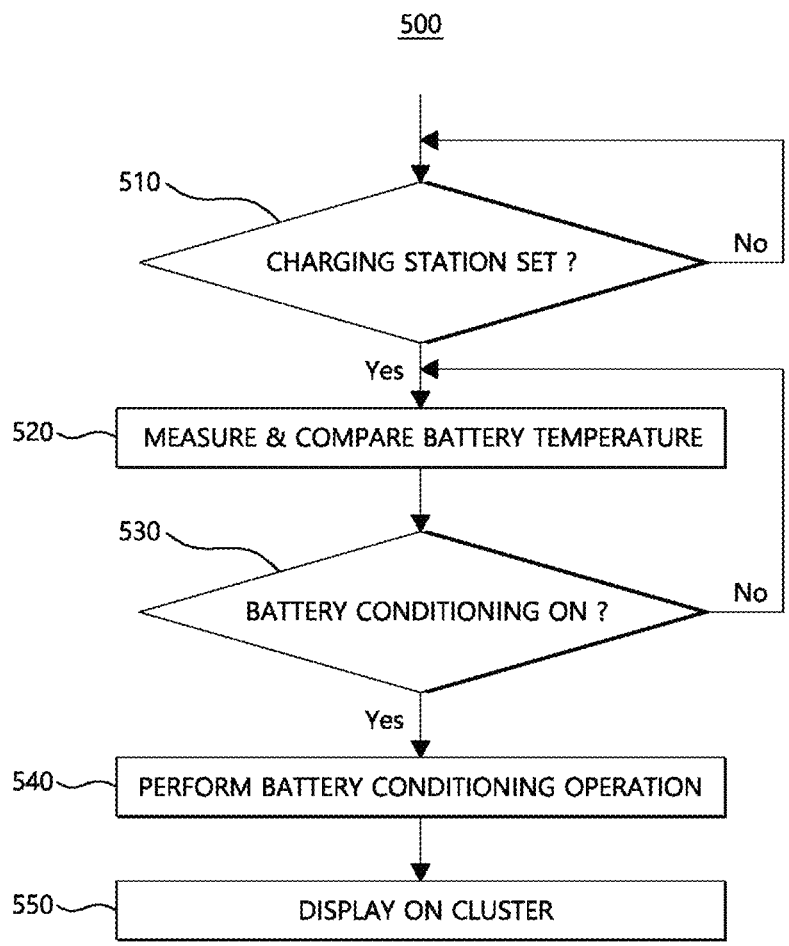
FIG. 5 is an embodiment of a second recommended sub-mode in the recommended mode.

FIG. 5 is an embodiment of the second recommended sub-mode in the recommended mode.

Referring to FIG. 5, a second recommended sub-mode 500 includes a step 510 of determining whether a second trigger condition including whether a charging station is set in at least one of a destination or a waypoint of the electric vehicle is satisfied, and a step 520 of comparing the battery temperature with a preset target temperature (or optimum temperature) to determine whether the battery temperature is low or high compared to the preset target temperature upon determining that the second trigger condition is satisfied (510, Yes). The second recommended sub-mode 500 further includes a step 530 of determining whether to perform the battery conditioning operation according to the temperature of the battery, a step 540 of performing the battery conditioning operation upon determining to perform the battery conditioning operation in the step 530 of determining whether to perform the battery conditioning operation (Yes), and a step 550 of displaying start of the step of performing the battery conditioning operation on the cluster 120 when the step is started.

In particular, in the step 530 of determining whether to perform the battery conditioning operation, at least one of a remaining distance and remaining time to the charging station, or a charging type of the charging station is calculated. It is possible to further include a process of setting a temperature for achieving a minimum charging time according to an arrival time of the electric vehicle at the charging station.

In battery conditioning, the DTE of the electric vehicle may decrease due to power consumed when the temperature of the battery 150 is raised or lowered. The recommended mode proposed by the present disclosure is advantageous in reflecting a usage habit of the user who puts more importance on the DTE while the charging time is reduced or uses a charging station in a parking lot while charging is not urgent.

In order to perform the battery conditioning process according to the custom mode, the following prerequisites need to be satisfied.

The user of the electric vehicle completes account linking and system with the mobile phone of the user, and a state in which the user activates the function of performing the battery conditioning management method according to the present disclosure is the default.

In a state where the above basic conditions are satisfied, the user needs to enter a departure time, enter reserved charging in advance, or execute reserved charging (air conditioning) and immediate charging (air conditioning) through an application of the mobile phone 170. In one embodiment, the power condition of the electric vehicle is an IGN3 state, which is the slow charger connection condition.

Figure 6:
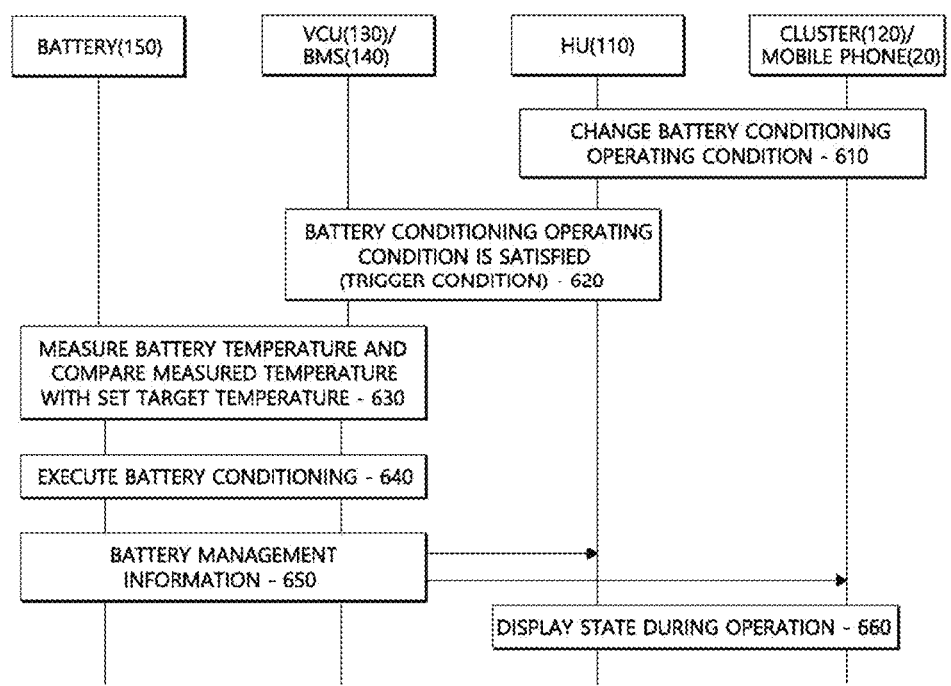
FIG. 6 illustrates an operation mechanism of a custom mode included in the battery conditioning management method.

FIG. 6 illustrates an operation mechanism of the custom mode included in the battery conditioning management method.

Referring to FIG. 6, a custom mode 600 is performed by the battery 150, the VCU 130, the BMS 140, the head unit 110, and the cluster 120/mobile phone 170.

The user uses the head unit 110 or the mobile phone 170 to change the preset battery conditioning operating condition (610). Here, the preset battery conditioning operating condition may be separately set and stored, and may refer to a battery conditioning operating condition already set in the recommended mode (FIG. 2).

The VCU 130 and the BMS 140 together with the head unit 110 determine whether the battery conditioning operating condition including the condition changed by the user is satisfied (620). The battery conditioning operating condition may be referred to as a trigger condition in a narrow sense.

Upon determining that the battery conditioning operating condition is satisfied, the VCU 130 and the BMS 140 detect the temperature of the battery 150, compare the current temperature of the battery 150 with the target battery temperature included in the battery conditioning operating condition (630), and then execute the battery conditioning operation according to a comparison result (640).

When the battery conditioning operation is executed, the VCU 130 and the BMS 140 deliver an execution process and management information to at least one of the head unit 110, the cluster 120, or the mobile phone 170 (650) and display the execution process and management information (660). Thus, the user may select one of the head unit 110, the cluster 120, or the mobile phone 170 and visually check the battery conditioning process.

The information displayed on the head unit 110, the cluster 120, and the mobile phone 170 may include, for example, at least one of the current temperature of the battery 150, the target temperature of the battery 150, power consumption required to control the battery temperature, an expected DTE after completion of battery conditioning, or an expected charging time of the battery.

Figure 7:
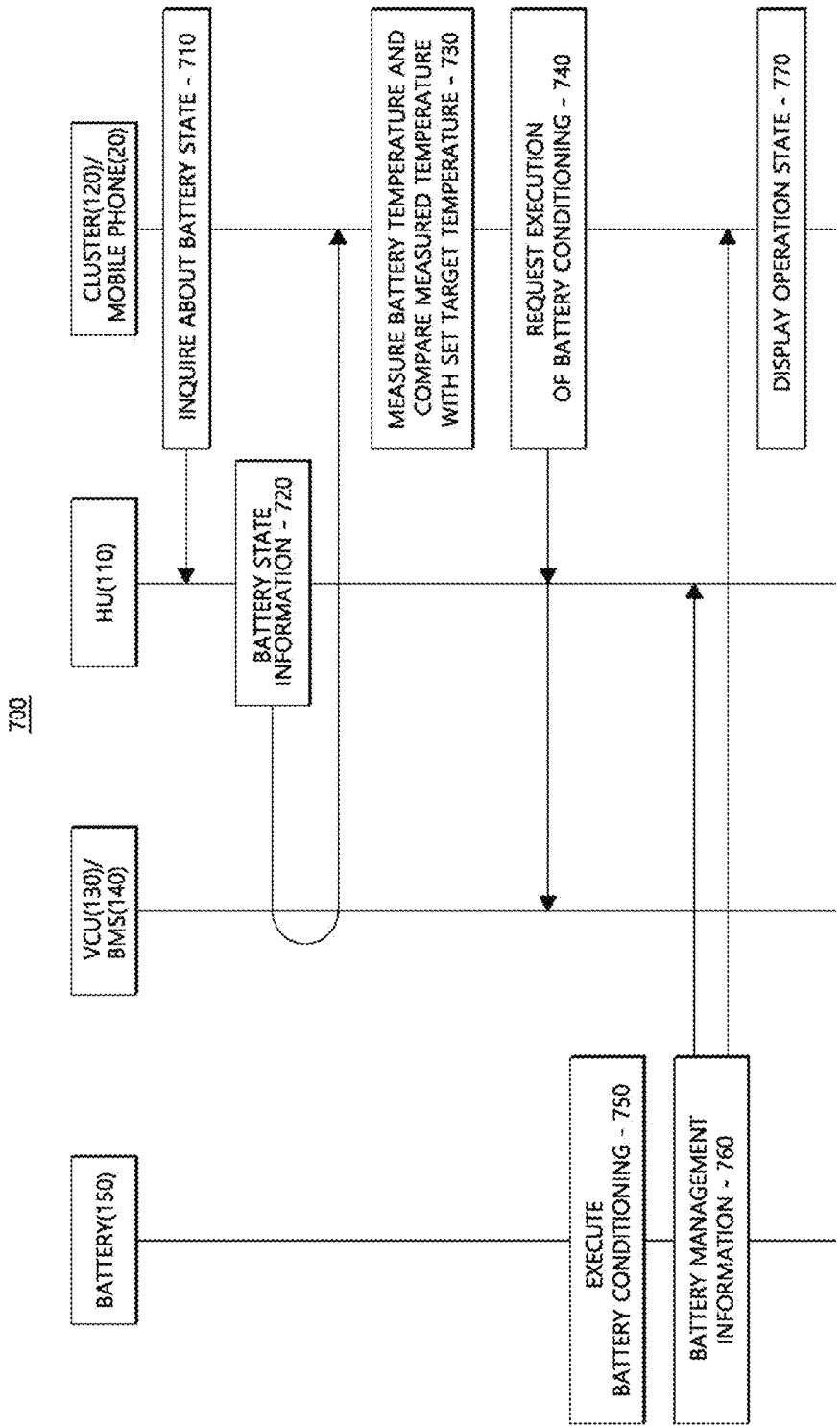
FIG. 7 illustrates an operation mechanism of a manual mode or a free mode included in the battery conditioning management method.

FIG. 7 illustrates an operation mechanism of the manual mode or the free mode included in the battery conditioning management method.

Referring to FIG. 7, a free mode 700 may be performed using the battery 150, the VCU 130, the BMS 140, the head unit 110, and the mobile phone 170.

The user may use the mobile phone 170 to refer to the head unit 110 for the state of the battery (710).

The head unit 110 collects battery state information from the VCU 130 and the BMS 140 and transmits the collected battery state information to the mobile phone 170 (720).

Here, the battery state information includes at least one of the current temperature of the battery 150, a current SOC of the battery, or the DTE.

The user compares the battery temperature included in the battery state information received from the head unit 110 with a set target temperature, and determines whether the battery is in a normal state or an abnormal state (S730).

When the user determines that the battery is currently in the abnormal state, the user requests the head unit 110 to execute battery conditioning (740). The head unit 110 receiving a request to execute battery conditioning from the mobile phone 170 of the user transmits this request to the VCU 130 and the BMS 140.

The VCU 130 and the BMS 140 receiving the request to execute battery conditioning from the head unit 110 execute battery conditioning on the battery 150 (750).

When the battery conditioning operation is executed, the VCU 130 and the BMS 140 deliver an execution process and management information to at least one of the head unit 110 or the mobile phone 170 (760) and display the execution process and management information (770), so that the user may select one of the head unit 110 or the mobile phone 170 and visually check the battery conditioning process.

The information displayed on the head unit 110 and the mobile phone 170 includes, for example, at least one of the current temperature of the battery 150, the target temperature of the battery 150, power consumption required to control the battery temperature, an expected DTE after completion of battery conditioning, or an expected charging time of the battery.

The recommended mode illustrated in FIGS. 3 to 5 focuses on temperature management or performance management of the battery, and is characterized in that remote control expected to be used by the user or the case where a charging station is set as a destination (or waypoint) is set as a trigger condition.

The custom mode illustrated in FIG. 6 allows the user to actively intervene in temperature management and performance management of the battery, and is characterized in that, for example, a part of particular interest to the user among driving distance, charging time, and battery protection may be strongly protected.

In the manual mode or free mode illustrated in FIG. 7, it is possible to check a trigger condition that is not satisfied by the existing condition and forcibly perform battery conditioning. Thus, the manual mode or free mode is characterized in that it is possible to perform battery conditioning before departure without reserved charging or a connector being inserted, and in particular, even when a slow charger is not installed in a parking lot, a battery conditioning function may be used forcibly before departure.

Although not described above, further development in conjunction with functions newly applied to electric vehicles in the future allows the battery to be more efficiently managed since the battery conditioning function may be extended and applied even in other trigger conditions not mentioned above.

The present disclosure described above may be implemented as computer-readable code on a medium in which a program is recorded. The computer-readable medium includes all types of recording devices in which data readable by a computer system is stored. Examples of the computer-readable medium include a hard disk drive (HDD), a solid state drive (SSD), a silicon disk drive (SDD), a ROM, a RAM, a CD-ROM, a magnetic tape, a floppy disk, an optical data storage device, etc.

The battery conditioning smart management system and the battery conditioning management method according to the present disclosure described above do not require any additional cost since an existing device is used, and are advantageous in that battery conditioning may be automatically performed without separate attention of the user, or in particular, the user may actively intervene and select a desired battery operation method by being allowed to visually monitor the battery management state of the vehicle, and a scheme of forcibly performing battery conditioning may be selected in some cases, so that it is possible to satisfy various preferences of users.

The effects obtainable in the present disclosure are not limited to the above-mentioned effects, and other effects not mentioned herein may be clearly understood by those of ordinary skill in the art to which the present disclosure belongs from the above description.

It should be apparent to those having ordinary skill in the art that various modifications and variations can be made in the present disclosure without departing from the spirit or scope of the present disclosure. Thus, it is intended that the present disclosure cover the modifications and variations of this present disclosure provided they come within the scope of the appended claims and their equivalents.

What is claimed is:

1. An electric vehicle comprising:
    a head unit configured to set and change a battery management mode, and display information related to a battery conditioning operation performed on a battery according to the battery management mode;
    a vehicle control unit (VCU) configured to control a battery conditioning process according to the battery management mode; and
    a battery management system (BMS) configured to:
        generate state information of the battery,
        deliver the state information to the head unit,
        detect a temperature of the battery,
        heat and cool the battery, and
        manage start and suspension values of the battery conditioning operation,
    wherein: the battery management mode includes: an automatic mode in which the VCU and the BMS perform battery conditioning based on a preset setting condition, and a manual mode in which a user forcibly performs battery conditioning;
    the state information of the battery includes a state of charge (SOC) of the battery and battery conditioning operation information; and
    the battery conditioning operation information includes at least one of a temperature of the battery, estimated power consumption up to an SOC level for achieving a target temperature of the battery, or an estimated time up to the SOC level.

2. The electric vehicle according to claim 1, wherein the head unit is configured to:
    check information about set battery conditioning setting,
    provide at least one of whether a charging station is set as a destination or a waypoint, a remaining time and a driving distance to the charging station, or charging type information of the charging station when the battery conditioning setting is activated, and
    transmit state information of the battery to a connected car services (CCS) server.

3. The electric vehicle according to claim 1, further comprising a cluster configured to display information related to the battery conditioning operation.

4. The electric vehicle according to claim 3, wherein the cluster is configured to:
receive a signal indicating that the battery conditioning operation is activated from at least one of the VCU or the BMS, or
activate an icon indicating activation of the battery conditioning operation upon receiving information indicating that the battery conditioning operation is activated when the electric vehicle is in motion.

5. The electric vehicle according to claim 1, wherein:
at least one of the VCU, the BMS, or the head unit is configured to transmit information indicating that the battery conditioning operation is activated to an external mobile phone; and
a user is allowed to reserve charging of the battery, change a setting of the battery management mode, and remotely control charging by using the mobile phone.

6. The electric vehicle according to claim 1, wherein the automatic mode includes:
a recommended mode in which battery conditioning is performed according to a preset program; and
a custom mode in which battery conditioning is performed according to a setting condition changed by a user.

7. The electric vehicle according to claim 6, wherein the program set in the recommended mode causes the battery conditioning process to be performed by reflecting at least one condition among a setting interface, a trigger condition, a target battery temperature, a battery conditioning reference condition, a display subject during operation, a vehicle power condition, or a battery conditioning operation suspension condition for each of when the electric vehicle is parked and when the electric vehicle is in motion.

8. The electric vehicle according to claim 7, wherein the setting condition changed by the user in the custom mode includes at least one condition reflected in the set program in the recommended mode.

9. The electric vehicle according to claim 8, wherein the trigger condition is:
whether reserved charging/air conditioning and immediate charging/air conditioning are set when the electric vehicle is parked; and
whether a charging station is set as a destination or a waypoint when the electric vehicle is in motion.

10. The electric vehicle according to claim 8, wherein the battery conditioning reference condition is:
a departure time of the electric vehicle when the electric vehicle is parked; and
a remaining distance/remaining time to a charging station and presence of charging type information of a charging station when the electric vehicle is in motion.

11. The electric vehicle according to claim 8, wherein the display subject during operation is:
a mobile phone when a user is outside the electric vehicle and the electric vehicle is parked; and
a cluster when the electric vehicle is in motion.

12. The electric vehicle according to claim 8, wherein the battery conditioning operation suspension condition is a time when the battery SOC level is less than or equal to a preset specific level.

13. A battery conditioning management method for controlling a temperature of a battery according to a preset battery management mode, the method comprising:
performing a recommended mode in which a battery conditioning process is performed according to a program preset by a vehicle control unit (VCU) and a battery management system (BMS) using presence or absence of remote control expected to be used by an electric vehicle and whether a charging station is set in a driving destination or a waypoint of the electric vehicle as a trigger condition; and
performing a custom mode in which a battery conditioning process is performed by the VCU and the BMS under a condition arbitrarily changed by a user of the electric vehicle among conditions reflected in the program for performing the battery conditioning process in the recommended mode.

14. The method according to claim 13, wherein the preset program causes the battery conditioning process to be performed by reflecting at least one condition among a setting interface, a trigger condition, a target battery temperature, a battery conditioning operation condition, a display subject during operation, a vehicle power condition, or a battery conditioning operation suspension condition for each of when the electric vehicle is parked and when the electric vehicle is in motion.

15. The method according to claim 14, wherein:
performing the recommended mode includes:
performing a first recommended sub-mode performed when the electric vehicle is parked; and
performing a second recommended sub-mode performed when the electric vehicle is in motion, and
performing the first recommended sub-mode includes:
determining whether a first trigger condition is satisfied, the first trigger condition including at least one of a departure time and reserved charging entered by the user of the electric vehicle, reserved charging (air conditioning) through a phone application, or execution of immediate charging (air conditioning);
determining whether to perform a battery conditioning operation depending on whether a battery temperature is high or low compared to a preset optimum temperature upon determining that the first trigger condition is satisfied; and
performing the battery conditioning operation upon determining to perform the battery conditioning operation in the determining whether to perform the battery conditioning operation.

16. The method according to claim 15, wherein determining whether to perform the battery conditioning operation includes:
calculating a time and power required when a temperature of the battery is conditioned to the optimum temperature until the departure time; and
displaying a start of the performing the battery conditioning operation on a phone application when the performing the battery conditioning operation is started.

17. The method according to claim 15, wherein performing the second recommended sub-mode includes:
determining whether a second trigger condition is satisfied, the second trigger condition including whether a charging station is set in at least one of a destination or a waypoint of the electric vehicle;
determining whether to perform a battery conditioning operation depending on whether a battery temperature is high or low compared to a preset optimum temperature upon determining that the second trigger condition is satisfied; and
performing the battery conditioning operation upon determining to perform the battery conditioning operation in the determining whether to perform the battery conditioning operation.

18. The method according to claim 17, wherein determining whether to perform the battery conditioning operation upon determining that the second trigger condition is satisfied includes:
 calculating at least one of a remaining distance and remaining time to the charging station, or a charging type of the charging station; and
 displaying a start of the performing the battery conditioning operation on a cluster when the performing the battery conditioning operation is started.

* * * * *